US012793237B2

(12) United States Patent
Wiesner et al.

(10) Patent No.: US 12,793,237 B2
(45) Date of Patent: Nov. 10, 2026

(54) METHOD FOR COORDINATIVE MEASURING BY TERRESTRIAL SCANNING WITH IMAGE-BASED INTERFERENCE DETECTION OF MOVING OBJECTS

(71) Applicant: LEICA GEOSYSTEMS AG, Heerbrugg (CH)

(72) Inventors: Tobias Wiesner, Berneck (CH); Christoph Herbst, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 382 days.

(21) Appl. No.: 18/139,216

(22) Filed: Apr. 25, 2023

(65) Prior Publication Data

US 2023/0342952 A1 Oct. 26, 2023

(30) Foreign Application Priority Data

Apr. 25, 2022 (EP) .................................... 22169700

(51) Int. Cl.
*G06K 9/00* (2022.01)
*G01C 11/36* (2006.01)
(Continued)

(52) U.S. Cl.
CPC .............. *G06T 7/248* (2017.01); *G01C 11/36* (2021.08); *G06V 10/764* (2022.01); *G06V 20/41* (2022.01);
(Continued)

(58) Field of Classification Search
CPC ...... G01C 15/002; G01C 15/00; G01C 11/36; G01C 11/08; G01C 11/06; G01S 17/08;
(Continued)

(56) References Cited

U.S. PATENT DOCUMENTS 11,727,580 B2 * 8/2023 Ehala ...................... G06T 7/248 345/632
2012/0249997 A1 * 10/2012 Matsumoto ........... G01S 7/4817 356/4.01
(Continued)

FOREIGN PATENT DOCUMENTS

CN 108271408 A 7/2018
CN 108734690 A 11/2018
(Continued)

OTHER PUBLICATIONS

N. Kongurgsa, N. Chumuang and M. Ketcham, "Real-Time intrusion—Detecting and alert system by image processing techniques," 2017 10th International Conference on Ubi-media Computing and Workshops (Ubi-Media), Pattaya, Thailand, 2017, pp. 1-6 (Year: 2017).*
(Continued)

*Primary Examiner* — Gregory A Morse
*Assistant Examiner* — Kevin M Coomber
(74) *Attorney, Agent, or Firm* — Maschoff Brennan

(57) ABSTRACT

Automatic method for coordinative measuring of a measurement space with a stationary terrestrial scanning measuring device having an emitting unit for directed emission of radiation as a free beam and at least one camera arranged in known spatial relationship to the emitting unit.

17 Claims, 4 Drawing Sheets

(51) Int. Cl.
*G06T 7/246* (2017.01)
*G06V 10/764* (2022.01)
*G06V 20/40* (2022.01)

(52) U.S. Cl.
CPC ................................ *G06T 2200/24* (2013.01); *G06T 2207/10016* (2013.01); *G06T 2207/10028* (2013.01); *G06T 2207/30196* (2013.01); *G06V 2201/08* (2022.01)

(58) Field of Classification Search
CPC .......... G01S 17/58; G01S 17/42; G01S 17/89; G06T 7/70; G06T 7/248; G06T 2207/30196; G06T 2200/24; G06T 2207/10016; G06T 2207/10028; G01B 11/14; G06V 20/41; G06V 10/764; G06V 2201/08
See application file for complete search history.

(56) References Cited

U.S. PATENT DOCUMENTS

| | | | | |
|---|---|---|---|---|
| 2018/0348343 | A1 | 12/2018 | Achour et al. | |
| 2019/0246075 | A1* | 8/2019 | Khadloya | G06V 40/10 |
| 2020/0249017 | A1* | 8/2020 | Török | G01C 3/08 |
| 2020/0284883 | A1 | 9/2020 | Ferreira et al. | |
| 2021/0157330 | A1 | 5/2021 | Tran | |
| 2022/0391686 | A1* | 12/2022 | Decrop | G06F 16/55 |

FOREIGN PATENT DOCUMENTS

| | | | |
|---|---|---|---|
| CN | 111428621 | A | 7/2020 |
| EP | 2 506 035 | A2 | 10/2012 |

OTHER PUBLICATIONS

Hu, W. C., Chen, C. H., Chen, T. Y., Huang, D. Y., & Wu, Z. C. (2015). Moving object detection and tracking from video captured by moving camera. Journal of Visual Communication and Image Representation, 30, 164-180. (Year: 2015).*
Extended European Search Report dated Sep. 13, 2022 as received in Application No. 22169700.6.
Leica RTC360 3D Reality Capture Solution, Leica Geosystems AG, Apr. 2022.
Leica Nova MS50 White Paper, Leica Geosystems AG, Nov. 2013.
EP Third Party Observations dated Jun. 4, 2025 as received in Application No. 22169700.6.

* cited by examiner

METHOD FOR COORDINATIVE MEASURING BY TERRESTRIAL SCANNING WITH IMAGE-BASED INTERFERENCE DETECTION OF MOVING OBJECTS

BACKGROUND

The disclosure relates to a method for terrestrial laser scanning and a terrestrial laser scanning device according to the independent claims.

3D scanning is a very effective technology for producing millions of spatial measurement points of objects within minutes or seconds. Terrestrial laser scanning technology is used to collect static point cloud data of fixed non-moving man-made structures (such as buildings, construction sites, industrial plants) or scenes of non-moving man-made objects (e.g., crash sites). Typical measurement tasks are the recording of objects or the surfaces thereof such as industrial plants, house facades or historical buildings, but also accident sites and crime scenes. Surveying apparatuses with scanning functionality are, for example, total stations and laser scanners, such as the Leica RTC360 or Leica Multi Station 50, which are used to measure or create 3D coordinates of surfaces. For this purpose, they have to be able to guide the measurement beam of a distance measuring device continuously over surfaces within a measurement space and in the process simultaneously to detect direction and distance with respect to the measurement point. From the distance and the direction information correlated therewith for each point, a so-called 3D point cloud is generated by means of data processing.

Such stationary terrestrial measuring devices have for this purpose at least one radiation source for generating optical measuring radiation, often laser radiation, and optical means such as lenses, prisms, mirrors, light-guiding fibers, or collimators, by means of which the generated measuring radiation can be emitted in free space onto a target to be measured, because of which these devices are also referred to as so-called free beam sensors. Optical measuring radiation is understood in this case as electromagnetic radiation, not only in the visible range of the spectrum, but rather also radiation in the ultraviolet, in the infrared, and in the terahertz range. Optoelectronic measuring devices are known which use measuring radiation having a wavelength of 405 nm, 532 nm, 635 nm, 650-690 nm, 780 nm or 785 nm, 795 nm, 808-850 nm, 905 nm, 980 nm, 1064 nm, or between 1500 and 1570 nm.

In terms of the fundamental structure, such terrestrial laser scanners are thus designed to detect a distance to an object point as measurement point using a, usually electrooptical and laser-based, distance measuring device. A direction deflecting unit likewise present is in this case designed in such a way that the measurement beam of the distance measuring device is deflected in at least two independent spatial directions, as a result of which a spatial measurement region can be recorded. The scanning region in the horizontal is here frequently 360°, i.e. one full circle, and in the vertical for example 180°, with the result that at least one hemisphere is covered, which together with the maximal measurement distance define the measurement space. The deflecting unit can be realized in the form of a moving mirror or alternatively also by other elements suitable for controlled angular deflection of optical radiation, such as, for example, rotatable prisms, movable optical waveguides, deformable optical components, etc. The measurement is usually affected with determination of distance and angles, that is to say in spherical coordinates, which can also be transformed into Cartesian coordinates for display and further processing. The distance measuring device can be embodied for example according to the principles of time of flight (TOF), phase, waveform digitizer (WFD) or interferometric measurement. For fast and accurate scanners, in particular a short measurement time in conjunction with high measurement accuracy is required, for example a distance accuracy in the mm range or below with measurement times of the individual points in the submicroseconds to milliseconds range. In this case, the measurement region ranges from a few centimeters up to a few kilometers.

The spatial measurement resolution is of particular importance in this case. It determines what details can still be identified, but also the duration of the scanning process and the volume of data obtained in the process. Measurement projects with modern high-speed scanners produce 3D point clouds having a cardinality of, for example, hundreds of millions or billions of object points and beyond. The storage, transmission and processing of the enormous volume of data associated therewith poses great challenges for hardware and software. For example, the execution speed of programs for evaluating the 3D data is greatly dependent on the number of scanning points. It would therefore be advantageous if only those points or data that are actually of relevance to the respective measurement task were recorded.

Amongst others, irrelevant scan points are recorded in real life in that undesired moving or movable objects (pedestrians, animals, moving cars) might cross the scan lines of the stationed laser scanner during the workflow-which can take several minutes or even longer- and therefore are scanned/imaged.

Such unwanted and/or moving objects can further disturb or destroy the measurements. In addition to generating the point cloud there often is captured a digital image of the object by a capturing unit of the geodetic measuring device. The digital image provides further information concerning the object, e.g., concerning colors or textures of the object which can be combined with the point cloud. As for obtaining such a colorized or textured point cloud (overlay/projection of digital 2D-image data for texturization or colorization of the 3D-scan data) two steps are necessary, namely scanning and capturing of digital images with one or more cameras of the laser scanner. These two steps take place one after the other. That is, after the 3D point data has been collected, digital images of the measured space are collected and projected onto the 3D data such that the point data also comprises color information. It is a typical scenario that suddenly pedestrians and/or vehicles appear in the scanning area while the scan is performed, or the digital images are collected. Such a change in the scanning area before both scanning and imaging are completed leads to a partly mismatch or inconsistence of point cloud and corresponding colors/textures derived from the images.

Another typical scenario is that the user or operator of the scanner himself may be in the scanning area by mistake. Ideally, the user is not in the scanned room at all and can therefore not observe the situation directly.

But even if the operator is not in the scanned room, unexpected events may occur with undesired objects unintentionally destroy the scan/imaging data. For example, inside buildings, pets, even if they don't move, can be unwanted objects. This may also apply to photos that show easily recognizable people. This is an important topic, e.g., for the real estate business.

In the worst case, such undesired effects are noticed only later in the office during the data processing when it is too late or basically impossible to repeat the scan/imaging process.

Undesired objects which are not detected during the office import can only be removed manually and hence not easily be eliminated (if possible, at all), which is a tedious and time-consuming task.

SUMMARY

Therefore, the object of the present disclosure is to provide an improved scanning method. This object is achieved by the characterizing features described herein.

The present disclosure relates to an automatic method for coordinative measuring of a measurement space with a stationary terrestrial scanning measuring device—in the following referred to as laser scanner-having an emitting unit for directed emission of radiation as a free beam and at least one camera arranged in known spatial relationship to the emitting unit and thus to an, in particular azimuthal, emission direction of the free beam. The scanning method comprises the automatic steps of acquiring multiple sequential live images of the measurement space with the camera, particularly in form of a video stream and/or covering simultaneously the complete measurement space, in parallel to a scanning with the beam.

The method further comprises determining presence of a potentially moving object—i.e. an object which actually is moving or could be moving—in the measurement space and—in case a potentially moving object is present-a spatial relation of the potentially moving object to a current emission direction by or based on image processing of at least part of the acquired images, the image processing comprising classifying image content according to defined object classes, preferably using a neural network and/or based on semantic image segmentation. In particular, images are taken during the rotation of the laser scanner around the azimuth axis, objects are tracked in the series of images and movement of the tracked objects relative to the scanner is evaluated.

The method further comprises estimating a possible interference of the potentially moving object with the scanning beam based on the determined spatial relation—and optionally also based on the class the object is classed to—and triggering an automatic reaction of the laser scanner in response to a result of the estimating.

As additional automatic steps or as another aspect, there is an acquiring of multiple sequential live images of the measurement space with the camera, in particular in form of a video stream, in parallel to a capturing of at least one digital image of the measuring space in an imaging direction by the laser scanner, the at least one digital image being dedicated to be combined with 3D-scan data of the measuring space, in particular combined for colorization and/or texturization of the 3D-point cloud. Further, there is a determining presence of a potentially moving object in the measurement space and—in case a potentially moving object is present-a spatial relation of the potentially moving object to a current imaging direction based on image processing of at least part of the acquired images, the image processing comprising classifying image content according to predefined object classes, estimating a possible interference, in particular a presence in the field of view, of the potentially moving object with the capturing of the at least one digital image based on the determined spatial relation and triggering a reaction of the laser scanner in response to a result of the estimating.

As still additional steps or as still another aspect, there is an automatic in-field checking of consistency between an intensity image of a scan generated by the scanning and an digital image of at least part of the measuring space acquired by the laser scanner, the digital image being dedicated to be combined with the scan, in particular combined for colorization and/or texturization of the 3D-point cloud, with the automatic steps of matching of corresponding objects of the intensity image and the digital image, verifying a consistency of position of a matched object between the intensity image and the digital image, triggering a reaction, in particular outputting a notice to a user of the laser scanner in case of an object mismatch and/or position inconsistency, e.g. in form of a graphic overlay on an image showing the object.

Thereby preferably, there is a classifying image content of the intensity image and the digital image, respectively, according to defined object classes and the matching is matching of corresponding classified objects of the intensity image and the digital image. As another preferred option, any determined potentially moving object, e.g. determined as described above by image processing of at least part of said acquired live images, is excluded from said matching; thus, potentially moving objects such as vehicles, pedestrians, animals, limbs etc. can be excluded from the comparison of the images' content, their impact on the result is then ignored.

Preferably, the defined object classes comprise at least a class of moving auto-mobile objects, in particular human beings, animals and/or vehicles. The defined object classes further comprise optionally at least a class of non-moving auto-mobile objects. Alternatively or additionally the object classes comprises at least a class of pictures of moving objects and/or of pictures of auto-mobile objects, i.e. a class of a depiction of a moving or auto-mobile object such as a drawing, photograph or movie visible in the camera's field of view.

As still another option, the defined object classes comprise at least a class of potentially moving objects to be ignored for at least one of the steps of determining spatial relation or estimating, wherein optionally the class to be ignored is selectable by a user and/or is automatically selected according to a determined object distance and/or class of measurement space wherefore the measurement space is classified based on image processing of at least part of the acquired images.

As another option, the defined object classes comprise at least one class of unwanted objects to be potentially excluded from being surveyed or captured (scanned and/or captured by the digital imaging) and the method comprises determining presence of such an unwanted object based on the image processing and—in case an unwanted object is present-outputting a notice to a user signaling presence of such an object in the measurement space and comprising an image showing at least part of the unwanted object, wherein optionally the class of unwanted objects is selectable by a user and/or is automatically selected according to a determined object distance and/or a class of measurement space wherefore the measurement space is classified based on image processing of at least part of the acquired images.

Optionally, the image processing comprises comparing positions of corresponding image regions of at least two of the sequential images considering a rotational movement of the camera caused by the scanning during image acquisition and classifying only objects of image regions of a position shift nonconforming to the camera rotation.

As another option, estimating a possible interference comprises estimating a future possible interference, preferably whereby said reaction is automatic pause of the scanning and/or digital image capturing when estimating a near future/imminent possible interference, and optionally an automatic continuation of the scanning when the moving object has moved a defined distance away from the emission direction.

In a further development, the reaction comprises an output of a notice, in particular a warning particularly to a user, via a man-machine interface, whereby the notice is a graphic overlay on at least one of the images comprising differently marking of the object according to at least one of a past interference or non-interference (with the beam and/or the digital image capturing) and/or a movement parameter such as velocity or pace and/or its proximity and/or spatial relation to the current emission direction. Alternatively, or additionally, the notice comprises one of the images showing at least part of the moving object at a time of a past possible interference (with the beam and/or the digital image capturing).

Preferably, the steps are continuously repeated until the complete measurement space is scanned and/or the method comprises acquiring live images before start of a scanning and automatic triggering a start of a scanning with the beam as a reaction of the laser scanner in response to a result of the estimating, in particular, if it is determined that there is no moving object in the measurement space.

Optionally, information resulting from at least one of the steps of determining, estimating and/or triggering is stored as meta-data attached to a point cloud established by the scanning. Therewith, post-processing in the office can be supported.

As another option, a user can select to tag an object according to the class it is classed to and store this tag as meta-information with the scan data. That is, it is offered to the operator to store the class of an object.

It is an advantage of the present disclosure that in the field, e.g., at the user's request detected possible disturbances or inconsistencies are either automatically pointed out. Or, in particular in the case a potentially moving object is detected, to automatically pause the scan before a potentially moving object appears in the scene (close to the laser beam or in the images taken for point cloud colorization). Once the undesired object disappeared the instrument might autonomously decide to continue to collect the data. Since live camera images covering the area around the scan beam are used, undesired moving or movable objects can be detected before they might disturb the scan data.

Additionally, when an unwanted, potentially moving and/or inconsistent object is detected, it can be automatically marked in a captured image and displayed on a directly or via cloud connected mobile device, e.g. a tablet, field controller or smart phone. The user/operator of the instrument can choose what to consider as unwanted/disturbing object. Examples of this would be moving or non-moving humans, animals, or vehicles. Further classes of undesired objects can be defined for special applications as well.

Advantageously, the user can already be warned during the scan workflow or directly after the scan workflow in the field where it is easy (and possible) to repeat the scan if necessary/desired. In case an undesired object is left in the data (e.g., by deciding not to repeat the scan/imaging), optionally, it would be possible to locate those objects and "delete" or "replace" them by inpainting in the scan data and images.

In preferred embodiments, one can distinguish between potentially moving objects which have crossed the scan lines or have been imaged in the digital image and therefore affected the scan data or are just close and potentially risky to potentially disturb the scan data. The corresponding actions might then be different (e.g., pause and resume the scan/digital imaging once the object is not too close to the scan line anymore). The surroundings may be streamed as an image stream to the mobile device of the user. Potentially undesired objects getting close to the scan line or FoV of the camera can be marked in the preview and shown to the user such that he can decide what to do before the scan data is disturbed.

BRIEF DESCRIPTION OF THE DRAWINGS

The coordinative measuring device and the method for scanning will be described in greater detail hereinafter, purely by way of example, with reference to exemplary embodiments depicted schematically in the drawings.

More specifically, in the drawing

DETAILED DESCRIPTION

Figure 1:
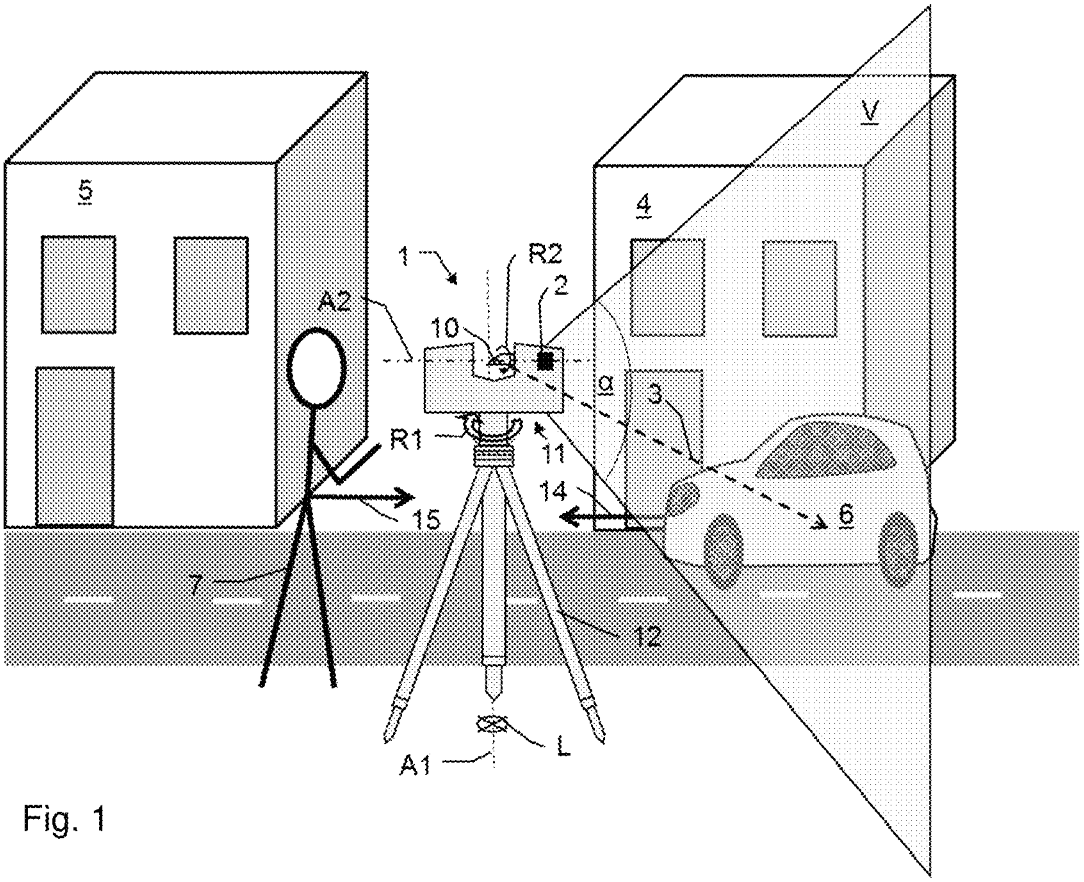
FIG. 1 schematically shows an exemplary use of a terrestrial laser scanner for scanning of a measurement space, FIGS. 2*a-e* schematically show an example of a method for automatically determining moving objects in the measurement space and determining if a reaction thereto is needed if such an object is present, FIG. 3 schematically shows an example of a method for automatically determining an unwanted object in the measurement space and determining if a reaction thereto is needed if such an object is present, and FIG. 4 schematically shows an example of a method for in-the-field check of consistency between scan data and digital image data.

FIG. 1 shows an exemplary use of a terrestrial laser scanner 1 as an example of a stationary surveying apparatus with scanning functionality for scanning of a measurement space. In the example, the measurement space or scanning region is an outdoor setting (street scene) for coordinative measuring of surfaces of buildings/properties 4, 5 as measurement objects. Other examples of a measurement space are indoor settings such as the interior of a factory building or an apartment or tenement.

As known in the art, such a laser scanner 1 comprises a base 12, e.g. a tripod with which it is stationed at a location L. An upper part 11 of the laser scanner 1 can rotate in a motor driven manner about a vertical axis A1 relative to the base 12 (arrow R1). A second rotation R2 around a second rotation axis A2 is provided by a rotary mirror 10 which deflects a laser beam 3 originating of laser source (not depicted) as a free beam along a target direction into the measurement space. By rotating R2 the mirror 10 about the transverse axis A2, the measuring beam 3 is guided in vertical fashion over an object's surface while the measuring beam 3 is guided horizontally over the surface by rotating R1 the entire upper part 11 about the vertical axis A1. Hence, the target direction of the free beam 3 is continuously changed in accordance with a known scanning pattern. The extent of rotation about both axis A1, A2 and the (maximal) measurement distance define the measurement space which is schematically indicated in the figure for one direction by grey vertical triangle V with vertical opening angle α. Often, a so called full-dome scan is performed, meaning a measurement space about the full rotation in the horizontal with an angular range in the vertical of e.g. α=270° with a maximal distance of some tenth meters, a hundred meters or several hundred meters so that a spherical range is provided, which depicts almost the entire surrounding up to the maximal range in all spatial directions. However, arbitrary other angle ranges are also possible.

A control and evaluation unit is data-connected to a light transmitter and a light receiver (not shown here) of the scanner 1. The control and evaluation unit is embodied to ascertain, for a multiplicity of measurement points, the distance between the laser scanner 1 and the measurement object 4, 5 for example from the time-of-flight or phase shift of the measuring beam 3 and its back-scattered components. In addition to the ascertained distance from the laser scanner 1 (or from the origin of the reference system resp. in relation to the station point S), each measurement point may in addition have a brightness value, which is likewise ascertained by the control and evaluation unit. The brightness is a greyscale value which is ascertained, for example, by integrating the band-pass-filtered and amplified signal of the light receiver over a measuring period assigned to the measurement point. These values form an intensity image of the scan.

Individual object points are thus measured, wherein the respective distance to the object point and the respective alignment of the measurement beam 3 in relation to two measurement axes A1, A2 (current horizontal and vertical emission direction) or two angles are determined. The scanning process thus produces a point set containing three-dimensional information about the surface of the scanned objects 4, 5. The totality of the measurement points of such a measurement is referred to as the scan and may yield a point cloud, for example. A display apparatus (not illustrated here), which can be configured as a display directly on the laser scanner 1 or as a display of a connected computer, e.g. tablet or smartphone, can be connected to the control and evaluation unit. Optionally, digital images, preferably high-resolution images of e.g. 1 MP minimum that allow additional color values to be assigned to the measurement points to provide a textured or colorized point cloud can also additionally be generated by means of one or often multiple color cameras 2 of the coordinate measuring device 1. Such a terrestrial laser scanner 1 can be equipped with one or more cameras 2 for taking images or providing a video stream of the surroundings during the scan workflow. Moreover, such surveying devices 1 with one or more cameras 2 are also known, said cameras 2 allowing wide angle or panoramic images of the measurement space to be recorded.

As such a scanning means measuring, e.g., millions of surface points by continuous sweep of the measurement beam 3 and continuous measurement instead of a targeted measurement of single points, the measurement space is recorded in a dense manner or completely, meaning that any object within the measurement space is scanned. This is particularly true for stationary, non-moving objects but also for moving objects if crossing the measurement beam 3 resp. the scan line. Hence, as depicted in the example, not only the buildings 4, 5 intended to be measured are scanned but also the vehicle 6 if it enters the measurement space (indicated by arrow 14) and passes in front of building 4 at a time the beam 3 is directed thereto as indicated in the figure. Another example as shown in the figure is a human being 7 walking in the measurement space (indicated by arrow 15), maybe even the operator of the scanner 1 himself, and potentially interfering with the measurement beam 3. Other examples are animals like cats or dogs, e.g. in interior settings. In particular such moving objects or potentially moving objects—hence concerning objects which are non-stationary or movable by nature or intended to move/be moved, in contrast to immovable or immobile objects like a rock or an arm chair or objects of still life-like a running car 6 or a human being 7 or an animal are not intended to be measured/scanned but potentially disturb the measurement, e.g., by being imaged in the point cloud and in the worst-case covering surfaces that should be measured which might be noticed not sooner than in the office when it is often too late to repeat the scan. The present disclosure provides a method for automatically reacting to such potentially moving objects 6, 7 in the field, in particular preventing that unwanted objects 6, 7 are recorded in the first place.

FIGS. 2*a*-2*e* show an example of a method, executed as part of a scanning functionality of the laser scanner, for automatically determining potentially moving objects in the measurement space and determining if a reaction thereto is needed if such an object is present. Depicted are two images I1, I2 as examples for live images of at least part of the measurement space acquired with a camera of the laser scanner during scanning. The one or more cameras attached or built-in to the laser scanner have a field of view covering the current scan direction or emission direction. Preferably, panoramic images are used and/or the cameras provide an all-around vision.

The images I1, I2 are part of an image sequence with respect to time whereby the second image I2 is taken some time after the first image I1. The time difference of acquisition is chosen such that considering the speed of rotation of the laser scanner or rather its upper part about the vertical or azimuth axis and therewith the camera or field of view the images I1 and I2 have an overlap. The shift of the field of view is illustrated in the figure by the horizontal shift ΔR.

The image content of the overlapping part is compared by image processing in knowledge of the rotational speed or extent of camera movement ΔR, e.g., using object tracking algorithms which take the camera rotation into account. The camera rotation or shift ΔR is preferably known by the scanning parameters. Image regions imaging still or non-moving objects such as building 4, 5 are shifted according to this shift ΔR. Hence, they can be found in the second image I2 by a displacement ΔR compared to the first image I1. If, on the other hand the displacement of a region does not behave as expected, i.e., is not equal to the overall image shift ΔR, an object of this region must have moved. In the example, the image regions 8 and 9 have such displaced image content caused by the movement of the driving car 6 and imaged pedestrian 7. Said otherwise, an object tracking algorithm is used to filter out the moving versus the non-moving objects relative to the scanner movement around its azimuth axis during the scan workflow. The object tracking algorithm might be based on classical algorithms and/or use artificial intelligence technology such as neural networks. The track-ing algorithm optionally takes into account additional sensor information such as the movement of the scanner (around the azimuth axis) or the depth information (distance of the object to the scanner) including the scan data and/or other technologies to estimate the distance of the moving object to the laser scanner.

At least one of the images I1, I2 may be piped through a neural network for multiple object detection (such as "You only look once"—Yolo- or "Single Shot Multibox Detector"—SSD- or similar). The neural network provides, e.g., a bounding box and a center of the detected objects together with the type of the detected object (e.g. "pedestrian", "car").

Additionally or alternatively, neural networks using image segmentation can be applied, which for example do not only provide a bounding box but the exact shape/outline of objects 6, 7.

Figure 2A:
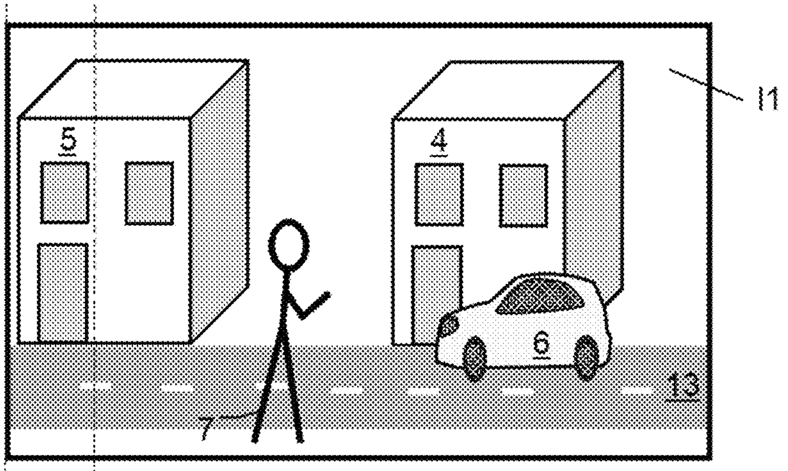
Figure 2B:
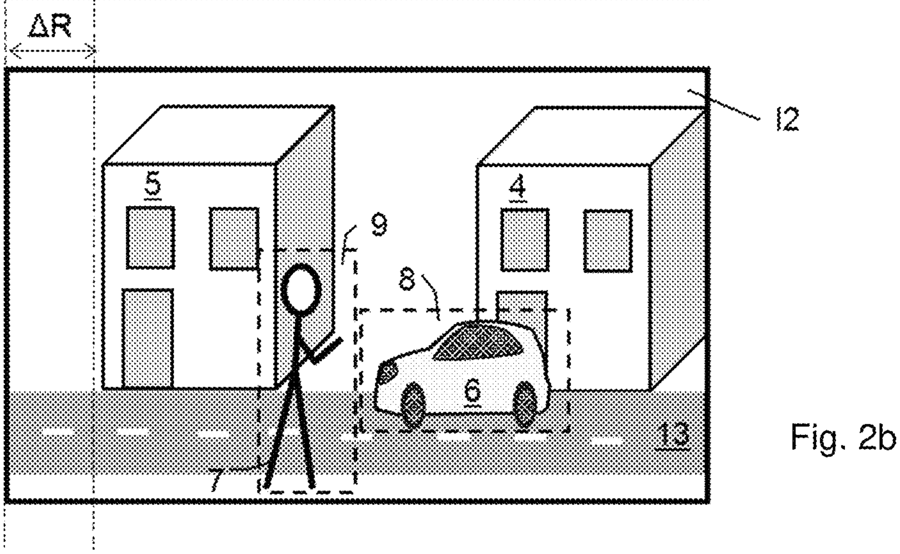
Figure 2C:
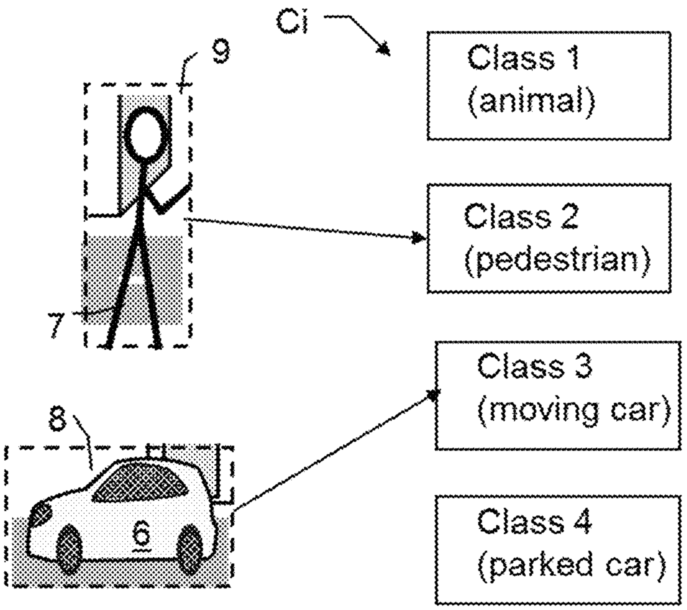

As indicated in FIG. 2*c*, advantageously, only said image regions 8, 9 having displaced image content/showing moving objects 6, 7 are further evaluated by image processing such as object detection and classifying. As schematically depicted in the figure, the image regions 8, 9 having moving object content are classified according to a set of defined object classes Class 1-Class 4. For example, region 9 is classed to a class "pedestrian" and region 8 to a class "moving car". Other examples of classes can be "human being" or "vehicle". Generally spoken, the classes preferably refer to one of an auto-mobile object in a broad sense, meaning classes of objects which can move by themselves such as human beings or animals and/or vehicles or transportation/locomotion means, in particular automobiles, bicycles, scooters or drones. Further, there can be one or more classes of objects that are movable (designed or configured to be moved) such as door leaves.

In any case, resulting from the image processing, e.g., a combination of a neural network for object detection and classifying and algorithms for object tracking in a moving (rotating) coordinate system as described above, a presence of moving objects are determined whereby moving objects are recognized as such. In particular, they are distinguished from similar but (actually) non-moving objects, for example, a running car is discriminated from a parked car or a walking human being from a still standing human being (or a dead human being/corpse, which is, e.g., relevant when scanning a crime site). They can even be distinguished, e.g. by an accordingly trained neural network, from a picture of a car (e.g. an advertising poster) or a picture of a human being which may be present e.g. in indoor scanning. In a broader approach, the algorithm preferably distinguishes any image of an object from a real object, hence, also for instance a movie on a screen showing a moving car or human being is recognized/classified as such and separated from a real moving car or pedestrian.

Preferably, an additional distinguishing is established by only taking actively moving objects into account, e.g. using above mentioned auto-mobile classes. To the contrary, passively moving objects such as leaves and branches of trees shaken by wind are ignored/sorted out and not further regarded. Seen otherwise, moving objects which do not move on but only show an alternating movement about a fix position (thus, there is no possibility that they change their current relative position to the scanner), are preferably treated differently, first of all not further treated. This sorting out can be based on classes of such objects; hence, if an object is classed to such a class it is ignored for any subsequent processing. The set of classes may further also comprise one or more classes of unwanted objects which are to be excluded from measurement/should not be scanned in general.

Classes of objects to be ignored or of unwanted objects may optionally be chosen before scanning by a user out of a set of classes. Alternatively or additionally they are automatically chosen as an adaption to the measurement space. For example, the measurement environment is automatically classified out of an image of the measurement space, e.g. "outdoor" or "indoor", and in case an outdoor setting is therewith recognized, the class "branch" or "plant" is selected to be ignored. As another criterion for an automatic selection of how an object is to be processed or ignored, the objects distance, e.g. estimated on its images size, can be used, e.g. an object far away (beyond a defined distance, e.g. a fixed value and/or in relation to the extent of the measurement space) is ignored while the same object is not when closer to the scanner.

Figure 2D:
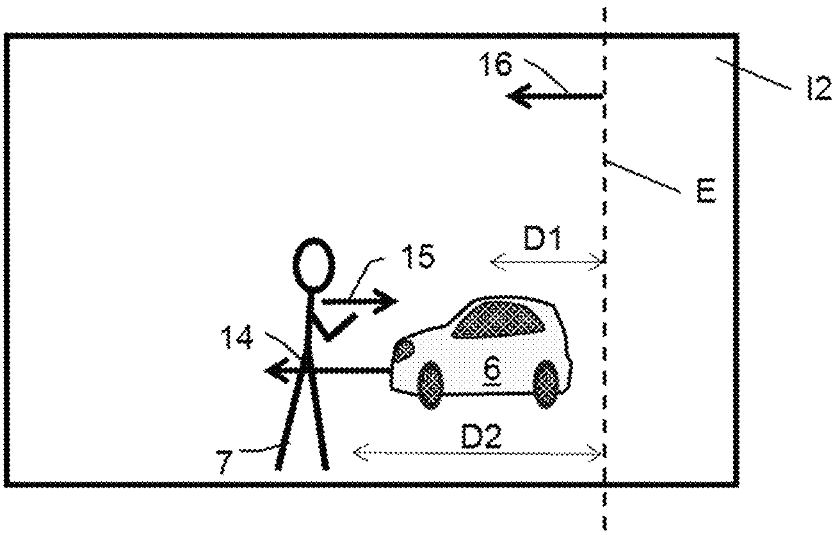

FIG. 2*d* illustrates an example for further processing of a recognized potentially moving object to be considered, e.g. classified to a relevant class as described above such as pedestrian 7 or driving car 6. The spatial relation of the objects 6, 7 to the current emission direction E is determined, indicated in the figure by the dashed line E in relation to the objects' position, e.g. defined by a bounding box of the object 6, 7, in the current live image I2. In the example, only the horizontal direction of emission is considered, however, also the vertical direction can be taken into account.

The spatial relation comprises the respective distance D1, D2 of the objects to the scan line E. In the example, further the location of the objects relative to the direction of beam sweep is determined, i.e. if the object is in front of the beam's running direction or behind. As still further parameters, the velocities of the objects and of the azimuthal rotation (indicated by arrows 14, 15, 16) are determined and taken into account. To sum up, in the example the movement of the objects 6, 7 relative to the movement of the laser scanner around the azimuth axis during the scanning workflow is looked at for determination of their mutual spatial relation.

Figure 2E:
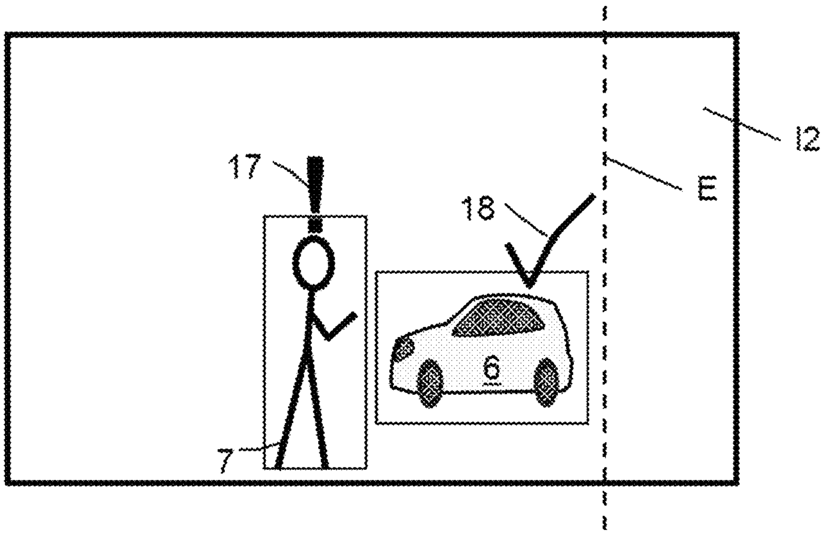

As schematically shown by FIG. 2*e*, based on the determined spatial relation of each object 6, 7 and the emission direction E, a possible or potential interference of the moving object's 6, 7 with the measurement beam/scanning is estimated. In the example, the velocity (as seen by the scanner) of the car 6 is such that it has the same direction as the horizontal scan direction whilst having a higher speed. Hence, probably, the car will stay ahead of the emission direction E and not be hit by the measurement beam. Thus, it is estimated that there will be no interference with the beam/scanning (indicated in the figure by ok-sign 18).

The estimating optionally takes the determined class of the respective object 6, 7 into account. For example, a stored class typical movement characteristic such as typical movement manner or pattern or a typical velocity is considered for estimating if an interference possibly has/will happen. Thereby, the location or surrounding of the object can be considered therewith; for instance, the road 13 the car 6 is driving on (cf. FIGS. 2*a, b*) is recognized and therefrom the future movement path along the road is predicted and checked if this highly probable movement path will cross the beam path.

To the contrary, as it is determined that the human being 7 is in front of the sweep and walks in the opposite direction, it is automatically estimated that he will possibly cross the scan line E. This possible future interference automatically triggers a reaction of the laser scanner.

In the example, one triggered reaction is outputting a visual or audible warning via a man-machine interface such as a loudspeaker or indication lights or e.g. a visual notice in form of a graphics (overlaid exclamation mark) 17 on a display (e.g. of the laser scanner or of a handheld device connected therewith) displaying a live image I2. Alternatively or additionally, particularly if the operator does not react to this warning 17 and an interference of the moving object is imminent (the person 17 is close to the scan line E and will be striven by the beam within the next second or the like), an automatic reaction is pause of the scanning. By such an interruption of the scan, it is automatically prevented that the moving object 7 is scanned and disturbing scan points are avoided.

As a further option, the position of the currently disturbing object 7 is continuously observed and when the object 7 crossed the current alignment of the laser scanner (in the example moved—a defined "safe" distance- to the right of the alignment E), the scan is automatically continued. As another option, the automatic image based surveillance of the measurement space with regard to moving objects 6, 7 is not only continuously executed during scanning until the scan is concluded but starts before and the scanning is automatically started if no moving object 6, 7 is detected in the measurement space or at least not in the vicinity of the beam alignment resp. a defined distance away from it, whereby moving direction and speed of the object and/or scanning speed can be taken into account.

A notice as reaction, e.g., in form of a graphic overlay on a camera image may also be triggered not only if an interference is estimated as possible/probable but as indicated in the figure by the ok-sign 18 which gives the operator notice that the respective object 6 will not interfere. Other graphical indications may relate to an object's velocity (speed and/or direction) or acceleration or its proximity to the current emission direction, e.g., with different colors according to a degree of distance or velocity. The surroundings may for instance be streamed as an image stream to a tablet of the user. Potentially undesired objects getting close to the scan line E can be marked in a preview and shown to the user such that he can decide what to do before the scan data is actually disturbed.

However, the estimating may not only relate to future interference but also to a current or past interference. Then, for example, if it is estimated based on the determined spatial relation that a moving object 6, 7 probably already has interfered with the scan beam resp. has been scanned, this may be indicated to the operator also in form of a graphic sign, e.g., marking the object in the live images. Alternatively or additionally, an image showing the object/measurement space at the time of the possible disturbance is displayed. This allows that the user can decide in the field if the disturbance can be tolerated (e.g., as no relevant surface is covered or only to a small extent such that, e.g., inpainting is possible) or if the scan has to be (partly) repeated.

Figure 3:
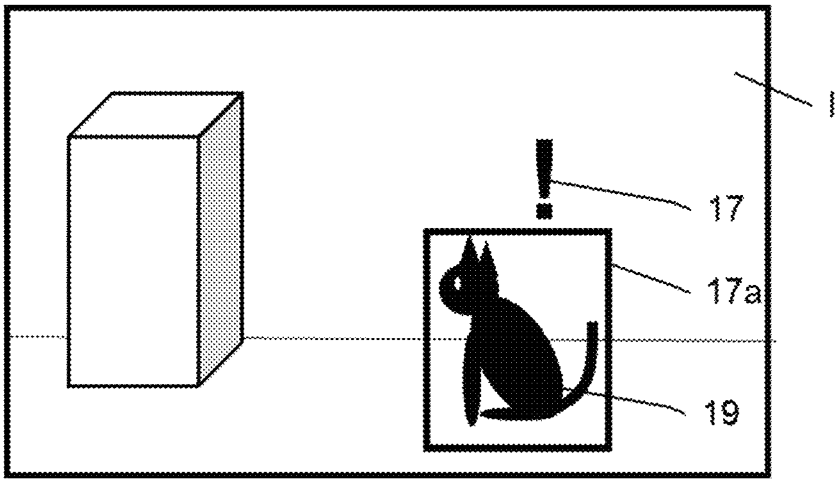

As schematically indicated in FIG. 3, in a similar way, presence of an unwanted object as mentioned above can be signalled to the user using a camera image showing the unwanted object (or at least part of it, e.g., in case of a large object). In the example, a class "animal" is defined and using image processing with classification of image content, a cat 19 is determined in a live camera image I if the measurement space as an unwanted object.

As indicated in the figure, the unwanted object (e.g., cat 19) is marked in the displayed image I by a bounding box 17*a* and by a warning sign 17 as a reaction to the determined presence of the cat 19. Thus, the user gets aware that an unwanted object is present and would be scanned and can react in the field to the presence of an unwanted object, which may be or may not be a moving object, in particular is a human being or an animal. As another automatic reaction, the laser scanner may also automatically omit the part of the measurement space containing the unwanted object and if possible—in case of a moveable object-scan the omitted part later when the object (e.g., cat 19) has gone; or react by putting out a visual and/or audible notice for animating a human being to change position/leave the measurement space or in case of presence of an animal (e.g., cat 19) such as a cat or dog trigger an ultrasonic emitter of the laser scanner or of an connected device to emit an ultrasound to chase away the animal (e.g., can 19), e.g. dislodge it out of the measurement space.

The above mentioned automatic determination and consideration of potentially moving objects or unwanted objects can also be applied to the collection of one or more-particularly high resolution-images as a source for generating an overlay (texture, color) of the scanned surfaces, either as an independent procedure or preferably in combination with the moving object scan beam interference surveillance/detection such that both the scan and the image(s) for texturing/colorize the scan are free of (intolerable) moving objects. Hence, using actual live images imaging at least part of the, preferably the complete measurement space (360°-view), e.g., a video stream, presence of a potentially moving object in the measurement space is automatically determined by image processing comprising classifying of image content of the live images as well as its spatial relation to an imaging direction according to which the digital image is captured. Based on the determined spatial relation, a possible interference of the moving object with the acquisition of the digital image is automatically estimated and a reaction to a result of the estimation is triggered. Thereby, said live images can be the ones acquired in parallel to above mentioned scanning (which means that the scanning and digital imaging are executed in parallel) or they are other/further live images, in particular if the digital imaging is executed before or after the scanning.

Thus, for instance, if a pedestrian is recognized in the live images it is estimated based on e.g. his position and moving direction if he will enter the current field of view of the camera of the laser scanner which captures the digital image, whereby if applicable in particular a rotation of the scanner/camera is taken into account. If it is estimated that the person will enter the field of view and thus disturb image acquisition, a pause of the digital imaging is triggered and automatically continued when the person has left the field of view. Other possible reactions are a warning of the operator of a past, present or future interference as in principle also described above, e.g., visually/graphically using one or more of the live images or a disturbed digital image. Thus, this method enables to prevent disturbed texturing images and/or to recognize a disturbance in the field, allowing for a quick reaction/compensation.

Figure 4:
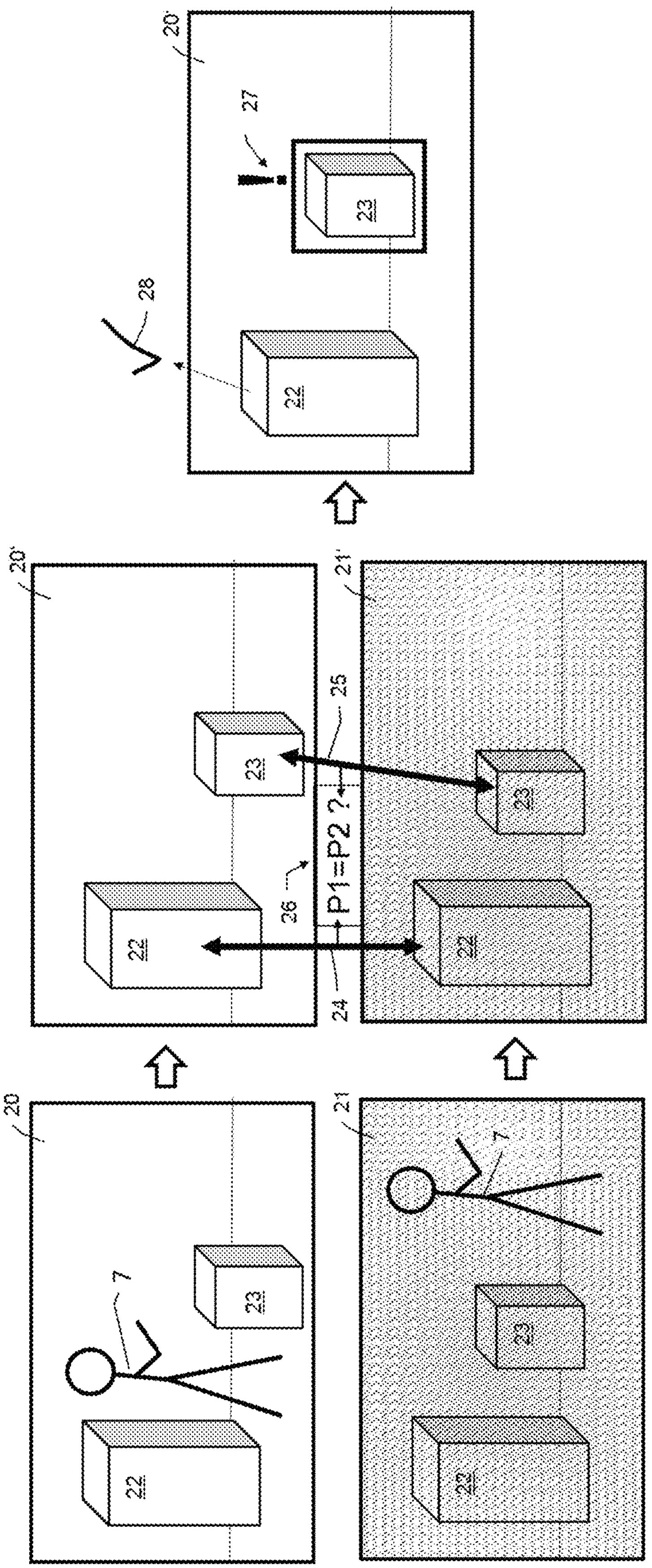

FIG. 4 depicts another aspect of the present disclosure which can be implied as a procedure subsequent to the aforementioned or as a separate or independent procedure. Depicted are schematically an intensity image 21 of a scan and an according digital image 20 for texture generation for the point cloud/colorization of the point cloud generated by the scan. Both images 20, 21 show substantially the same (part of) measurement space and thus should have equal image content resp. depict the same objects, in the example objects 22, 23, 7. However, in reality, e.g. caused by different times of acquisition, there might be differences or discrepancies which might lead to an erroneous textured or colorized point cloud.

To prevent such errors, the method comprises an in-the-field consistency check of the scan data (data of scan and texture image) using the intensity scan image 21 and the digital image 21. Aim is to detect inconsistencies in between them by detecting objects 22, 23 in both images 20, 21 and matching corresponding objects 22, 23 and comparing the positions of corresponding objects 22, 23.

In the example, first objects 22, 23, 7 are determined and classified according to defined object classes. If part of a workflow as described above, thereby objects determination results already present by the interference check/observation can be used, e.g. information about classified moving objects stored as metadata of a scan or digital image. The classes in particular distinguish moving objects 7 and stationary or immobile objects 22, 23. Moving objects 7 present in one or both images 20, 21 are disregarded or removed as schematically illustrated by cleared up images 20' and 21' which do not show the walking person 7. Alternatively or additionally, the digital image 20 and the intensity image 21 are correlated wherefore the RGB-camera image is transformed into a grey image which considers the reflectivity of the laser wave length approximately as a grey scale value.

The other, stationary objects 22, 23 should be both visible in the scan data/intensity image 21 and at the same position in the image 20 collected during the spherical imaging process for texture/color generation. The according verification is indicated the figure by arrows 24 and 25 and element 26: it is verified if the respective position P1 in the first image 20 of a corresponding object 22 or 23 is the same position P2 in the second image 21. In the example, the position of the object 22 on the left is consistent or concordant which is illustrated by the ok-sign 28. To the contrary, the positions of the right object 23 are different because in the example the person 7 has moved object 23 out of his path between acquisition of the digital image 20 and scanning.

This inconsistency with respect to object 23 is outputted as a notice to the user, e.g. as indicated in the figure on the right side using the digital image 20' (or alternatively an actual live image) with a graphical overlay 27 marking the inconsistent object 23, in the example by a bounding box and an exclamation mark. Therewith, the user is aware of the lack of consistency between scan and colorization image and can react thereto, e.g. repeat scanning or imaging. Alternatively or additionally, an automatic reaction in case of detection of inconsistency is automatic re-scanning or capturing a digital image to heal the inconsistency.

It goes without saying that these shown figures schematically show merely possible exemplary embodiments. The various approaches can also be combined with one another and combined with corresponding devices and methods of the prior art if not mentioned otherwise.

The invention claimed is:

1. An automatic method for coordinative measuring of a measurement space with a stationary terrestrial scanning measuring device having an emitting unit for directed emission of radiation as a free beam and at least one camera arranged in known spatial relationship to the emitting unit and thus to an emission direction of the free beam, the scanning method comprising the automatic steps of:

acquiring multiple sequential live images (I, I1, I2) of the measurement space with the camera, in particular in form of a video stream, in parallel to a scanning with the beam, determining presence of a potentially moving object in the measurement space and—in case a potentially moving object is present-a spatial relation (D1, D2) of the potentially moving object to a current emission direction (E) by image processing of at least part of the acquired images (I, I1, I2), the image processing comprising classifying image content according to defined object classes (Ci), estimating a possible interference of the potentially moving object with the scanning beam based on the determined spatial relation (D1, D2) and triggering an automatic reaction of the scanning measuring device in response to a result of the estimating, wherein the method further comprises:

acquiring multiple sequential live images (I, I1, I2) of the measurement space with the camera in parallel to a capturing of at least one digital image of the measuring space in an imaging direction by the scanning measuring device, the at least one digital image being dedicated to be combined with 3D-scan data of the measuring space, determining presence of a potentially moving object in the measurement space and—in case a potentially moving object is present-a spatial relation of the potentially moving object to a current imaging direction based on image processing of at least part of the acquired images (I, I1, I2), the image processing comprising classifying image content according to defined object classes (Ci), estimating a possible interference of the potentially moving object with the capturing of the at least one digital image based on the determined spatial relation, and triggering a reaction of the scanning measuring device in response to a result of the estimating of a possible interference of the potentially moving object with the capturing of the at least one digital image, wherein the method comprises an output of a notice via a man-machine interface, whereby the notice comprises a graphic overlay on a live image (I, I1, I2) with different marking of the object according to:

a past possible interference or non-interference and/or a movement parameter and/or its proximity (D1, D2) to the current emission direction (E), and/or the notice comprises one of the multiple images (I, I1, I2) showing at least part of the potentially moving object at a time of a past possible interference, and/or the notice signals to a user presence of an object to be potentially excluded from the scanning and/or digital image capturing in the measurement space and comprises an image (I) showing at least part of the object, wherein the defined object classes (Ci) comprise at least one class of objects to be potentially excluded from the scanning and/or digital image capturing and the presence of such object is determined based on the image processing.

2. The method according to claim 1, wherein the defined object classes (Ci) comprise at least a class of moving auto-mobile objects, in particular human beings, animals and/or vehicles.

3. The method according to claim 1, wherein the defined object classes (Ci) comprise at least a class of non-moving auto-mobile objects and/or of pictures of moving objects and/or of pictures of auto-mobile objects.

4. The method according to claim 1, wherein the defined object classes (Ci) comprise at least a class of potentially moving objects to be ignored for at least one of the steps of determining spatial relation of the potentially moving object to a current imaging direction or to an emission direction (E) or of estimating a possible interference.

5. The method according to claim 1, wherein the step of estimating the possible interference of the potentially moving object with the scanning beam and/or the capturing of the at least one digital image is also based on the class (Ci) the moving object is classed to.

6. The method according to claim 1, wherein the estimating of a possible interference comprises estimating a future possible interference.

7. The method according to claim 6, wherein the reaction is an automatic pause of the scanning and/or digital image capturing when estimating an imminent possible interference, and optionally an automatic continuation of the scanning or digital image capturing when the moving object has moved a defined distance away from the emission direction (E).

8. A stationary terrestrial scanning measuring device comprising an emitting unit for directed emission of radiation as a free beam and at least one camera arranged in known spatial relationship to the emitting unit and thus to an emission direction of the free beam, the scanning measuring device having an automatic coordinative measuring scan functionality configured to execute the method according to claim 1.

9. A computer program product comprising program code which is stored on a non-transitory machine-readable medium, and having computer-executable instructions for performing, particularly when executed on a processing unit of a terrestrial scanning measuring device, the method according to claim 1.

10. The method according to claim 1, wherein acquiring said multiple sequential live images (I, I1, I2) of the measurement space in form of a video stream.

11. An automatic method for coordinative measuring of a measurement space with a stationary terrestrial scanning measuring device having an emitting unit for directed emission of radiation as a free beam and at least one camera arranged in known spatial relationship to the emitting unit and thus to an emission direction of the free beam, the scanning method comprising the automatic steps of:

acquiring multiple sequential live images (I, I1, I2) of the measurement space with the camera, in particular in form of a video stream, in parallel to a scanning with the beam, determining presence of a potentially moving object in the measurement space and—in case a potentially moving object is present-a spatial relation (D1, D2) of the potentially moving object to a current emission direction (E) by image processing of at least part of the acquired images (I, I1, I2), the image processing comprising classifying image content according to defined object classes (Ci), estimating a possible interference of the potentially moving object with the scanning beam based on the determined spatial relation (D1, D2) and triggering an automatic reaction of the scanning measuring device in response to a result of the estimating, wherein the image processing comprises comparing positions of corresponding image regions of at least two of the sequential images (I1, I2) considering a rotational movement (ΔR) of the camera caused by the scanning during image acquisition and classifying only objects of image regions of a position shift nonconforming to the camera rotation.

12. An automatic method for coordinative measuring of a measurement space with a stationary terrestrial scanning measuring device having an emitting unit for directed emission of radiation as a free beam and at least one camera arranged in known spatial relationship to the emitting unit and thus to an emission direction of the free beam, the scanning method comprising the automatic steps of:

acquiring multiple sequential live images (I, I1, I2) of the measurement space with the camera, in particular in form of a video stream, in parallel to a scanning with the beam, determining presence of a potentially moving object in the measurement space and—in case a potentially moving object is present-a spatial relation (D1, D2) of the potentially moving object to a current emission direction (E) by image processing of at least part of the acquired images (I, I1, I2), the image processing comprising classifying image content according to defined object classes (Ci), estimating a possible interference of the potentially moving object with the scanning beam based on the determined spatial relation (D1, D2) and triggering an automatic reaction of the scanning measuring device in response to a result of the estimating, wherein the method further comprises in-field checking of consistency between an intensity image of a scan generated by the scanning and a digital image of at least part of the measuring space acquired by the scanning measuring device, the digital image being dedicated to be combined with the scan, with the automatic steps of matching of corresponding objects of the intensity image and the digital image, verifying a consistency of position (P1, P2) of a matched object between the intensity image and the digital image, triggering a reaction comprising outputting a notice to a user, in case of an object mismatch and/or position inconsistency.

13. The method according to claim 12, wherein any determined potentially moving object is excluded from said matching.

14. A computer program product comprising program code which is stored on a non-transitory machine-readable medium, and having computer-executable instructions for performing, particularly when executed on a processing unit of a terrestrial scanning measuring device, the method according to claim 11.

15. A computer program product comprising program code which is stored on a non-transitory machine-readable medium, and having computer-executable instructions for performing, particularly when executed on a processing unit of a terrestrial scanning measuring device, the method according to claim 12.

16. A stationary terrestrial scanning measuring device comprising an emitting unit for directed emission of radiation as a free beam and at least one camera arranged in known spatial relationship to the emitting unit and thus to an emission direction of the free beam, the scanning measuring device having an automatic coordinative measuring scan functionality configured to execute the method according to claim 11.

17. A stationary terrestrial scanning measuring device comprising an emitting unit for directed emission of radiation as a free beam and at least one camera arranged in known spatial relationship to the emitting unit and thus to an emission direction of the free beam, the scanning measuring device having an automatic coordinative measuring scan functionality configured to execute the method according to claim 12.

* * * * *